United States Patent [19]
Mathews et al.

[11] Patent Number: 6,071,481
[45] Date of Patent: *Jun. 6, 2000

[54] ZERO GRADE AIR GENERATING SYSTEM

[76] Inventors: Loren T. Mathews, 20450 Via Cristal; Radhakrishna M. Neti, 18561 Flora Dr., both of Yorba Linda, Calif. 92686; David R. Whineray, 2344 E. Peton Cir., Placentia, Calif. 92670

[*] Notice: This patent issued on a continued prosecution application filed under 37 CFR 1.53(d), and is subject to the twenty year patent term provisions of 35 U.S.C. 154(a)(2).

[21] Appl. No.: 09/034,060
[22] Filed: Mar. 3, 1998

Related U.S. Application Data

[63] Continuation-in-part of application No. 08/700,337, Aug. 8, 1996, abandoned.

[51] Int. Cl.[7] .................................................. B01D 50/00
[52] U.S. Cl. ......................... 422/170; 422/169; 422/171
[58] Field of Search .................................... 422/168, 169, 422/170, 171, 176, 177, 178, 189, 190, 186.3; 95/129; 423/235; 204/157.3

[56] References Cited

U.S. PATENT DOCUMENTS

| | | | |
|---|---|---|---|
| 3,755,534 | 8/1973 | Graham | 423/213.7 |
| 3,808,327 | 4/1974 | Roberts | 423/402 |
| 3,860,535 | 1/1975 | Johnson | 502/339 |
| 3,984,296 | 10/1976 | Richards | 204/157.3 |
| 4,344,280 | 8/1982 | Minakawa et al. | 60/39.092 |
| 5,284,556 | 2/1994 | Rich | 204/164 |
| 5,693,300 | 12/1997 | Slone | 423/235 |

*Primary Examiner*—Kathryn Gorgos
*Assistant Examiner*—Wesley A. Nicolas

[57] ABSTRACT

A zero air generating system comprises a hydrocarbon and NO oxidizer and a molecular sieve unit which are interconnected by suitable lines for continuous processing of the air stream. Flow control means is provided to maintain the flow rate of the air being treated to 5 liters/minute or less. The system may also include a separate NO to $NO_2$ converter. The system purifies shop air by reducing the concentration of contaminants such as $NO_2$, CO, $CO_2$, $H_2O$ and other remaining unoxidized hydrocarbons to levels acceptable under the IM-240 specification for instrument air. In a preferred embodiment of the invention, two parallel connected molecular sieves units are utilized in the system. Thus the air being treated can alternately flow through one molecular sieve while the other unit is in the process of being regenerated.

4 Claims, 1 Drawing Sheet

ZERO GRADE AIR GENERATING SYSTEM

RELATION TO PENDING APPLICATIONS

This application is a continuation-in-part of application Ser. No. 08/700,337, filed Aug. 8, 1996 now abandoned.

FIELD OF THE INVENTION

This invention relates to apparatus for producing clean, dry and pure air and more particularly to apparatus for producing zero grade instrument air.

BACKGROUND OF THE INVENTION

The Environmental Protection Agency has recently published proposed guidelines, procedures, emission standards and equipment specifications for inspection maintenance (ASM) equipment; *EPA Acceleration Simulation Mode Draft Procedures, Emission Standards, Quality Control Requirements, and Equipment Specifications,* dated Nov. 28, 1995, Version 15.6. The State of California has also proposed new, more stringent regulations in *California BAR Automotive inspection & Repair, Equipment for Test & Repair,* Dec. 15, 1995. Similar regulations are currently required in areas of the United States which are deemed non-attainment areas with excess air pollution levels.

These regulations, inter alia, set up new specifications for calibrating and zeroing emissions test equipment and require that the instruments be zeroed before each test using pure nitrogen or purified air, referred to as zero grade air. The proposed specifications define the purity of zero grade air as follows:

Concentration: 20.7%±0.5% Oxygen with Balance Nitrogen

Impurities:

less than 1 ppm Total hydrocarbons less than 1 ppm Carbon Monoxide less than 1 ppm Oxides of Nitrogen less than 1 ppm Carbon Dioxide Low cost emissions test equipment (i.e. California BAR-90 type) employ background ambient air to zero the gas analyzers. However, the proposed equipment specifications, among other things, require several times more sensitivity from the test equipment and consequently, require a more pure source of zero air to achieve a more accurate measurement at these new low levels of measurement. The proposed ASM specification for instrument air corresponds very closely to the EPA IM-240 zero air specification currently in use in certain areas, including the non attainment areas, of the United States.

Currently only two methods, bottled zero air or zero air generators, are being used to produce the aforementioned zero grade air. The zero air generators used for emissions test purposes are designed for very high flow rates, i.e. greater then 40 liters/minute, and are typically only used in facilities with multiple test lanes which can support the zero air generator cost as compared to the cost of bottled air. Multiple lane zero air generators are expensive and can range in cost from $10,000 to $16,000 per generator, depending on the flow rate of the generator. Bottled air, although satisfactory for the purpose, necessitates the expense and inconvenience of storing pressurized containers and can result in down time if new supplies are not timely reordered.

Many current methods exist to easily and cost effectively filter shop air (compressed air) and reduce background air concentrations of hydrocarbons and carbon monoxide to some extent. However, the existing methods and apparatus do not cost effectively provide for purification of background ambient air according to proposed emission test standards.

For example, most filtration methods will not adequately reduce the concentrations of oxides of nitrogen to less than 1 ppm nitric oxide.

Accordingly it is an object of this invention to provide a low cost method and apparatus for the production of zero air for use in the analysis of vehicle exhaust omissions and instrumentation for analytical laboratory gas measurement, such as, for example, flame ionization detectors (FID) and chemiluminescence analyzers (CLD).

SUMMARY OF THE INVENTION

The system of the present invention purifies shop air, such as contaminated air from a conventional shop air compressor, having an output pressure to the system of at least 60 psig and a flow rate on the order of 5 L/min. The system purifies such air to sub parts per million levels of contaminants such as hydrocarbons and oxides of nitrogen. The purified air is immediately available for use in the test apparatus and the necessity for and the expense of air reservoir containers is eliminated.

The system is particularly suited for small operations, such as a laboratory or a garage utilizing only one or two auto exhaust emission detectors. The present invention provides a low cost method and system for generating up to 5 liters/minute of an air source which meets the proposed requirements for zero grade instrument air as set out by the proposed EPA and California quality procedures and equipment specifications. The invention has been designed to meet the proposed reduction of contamination for the worst ambient condition. This condition reflects the maximum background concentrations which are allowed before starting a vehicle emissions test. Maximum background concentrations are as follows:

less than 500 ppm total hydrocarbons less than 200 ppm carbon monoxide less than 25 ppm oxides of nitrogen The present invention is particularly suited for use with any air compressor with an output of at least 60 psig and a flow rate of 5 liters per minute or more. In accordance with the invention conventional shop air, such as obtained from a shop air compressor, is treated to reduce contaminants to sub ppm levels. The apparatus is low cost, compact and self contained making it especially useful for use with auto emission analyzers found in commercial garages and repair shops.

The system comprises a hydrocarbon oxidizer and a molecular sieve unit which are interconnected by suitable lines for continuous processing of the air stream. An optional NO converter can be included where the No level of in the parts per billion range is required. Flow control means is provided to maintain the flow rate of the air being treated to 5 liters/minute or less. The system purifies shop air by reducing the concentration of contaminants such as $NO_2$, CO, $CO_2$, $H_2O$ and other remaining unoxidized hydrocarbons to levels acceptable under the IM-240 specification for instrument air.

In a preferred embodiment of the invention, two molecular sieve units are utilized in the apparatus. Thus the air being treated can alternately flow through one molecular sieve unit while the other unit is in the process of being regenerated.

DESCRIPTION OF THE PREFERRED EMBODIMENTS OF THE INVENTION

Figure 1:
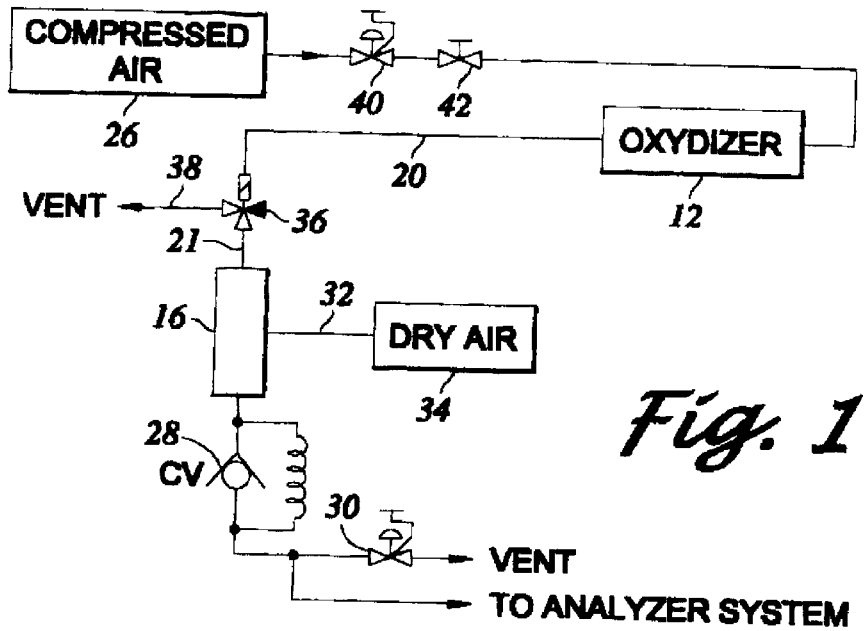
FIG. 1 is a flow diagram of the device of the present invention.

Referring to FIG. 1 there is illustrated, in a schematic block diagram, an embodiment of the system 10 of the invention which includes an oxidizer 12 for converting NO to $NO_2$ and for the oxidation of hydrocarbon contaminants in the stream of air being treated, and a molecular sieve 16. Although it is not essential, a separate converter (not shown) may be used to convert NO to $NO_2$. Any conventional device may be used such as a photochemical ozone generator utilizing ultraviolet radiation at a wavelength of around 1849 Å produced by a UV lamp or corona discharge as the conversion source for converting oxygen in the air stream to ozone. Ozone subsequently oxidizes NO to $NO_2$. Normally, however, there is no need for a separate converter for NO oxidation and the oxidizer will handle the oxidation of both the hydrocarbons and NO.

The oxidizer 12 consists of a heat resistant vessel having an interior defining an oxidizing chamber. A metal oxide catalyst consisting of a mixture of cupric oxide and manganese dioxide in the weight ratio of 67/33 parts is disposed in the oxidizing chamber. The catalyst is maintained at an elevated temperature to oxidize the hydrocarbon contaminants, such as methane to CO, $CO_2$ and $H_2O$. The elevated catalyst temperature is maintained at between about 200° C. and about 500° C. depending upon the flow rate of air through the system 10. As is well understood in the art, the higher the flow rate through the oxidizer 12, the higher the catalyst temperature required to effectively catalyze the oxidation of the hydrocarbon contaminants.

In the embodiment illustrated in FIG. 1, a single molecular sieve 16 is utilized as a final filter for the air stream being treated to remove contaminants such as $H_2O$, $CO_2$, CO, $NO_2$ and unoxidized hydrocarbons which managed to pass the oxidizer 12 and, if used, the converter. One type of molecular sieve adsorbent material used with good results in the sieve 16 is a pelletized zeolite material comprising an aluminosilicate zeolite containing alkali metal and/or alkali earth metal oxides. Good results have been obtained with such an aluminosilicate zeolite manufactured and sold by Union Carbide and identified as "Zero Air $CO_2$ Adsorbent, Type X" molecular sieve. The adsorbent material effectively filters at the molecular level and retains a substantial portion of the contaminant molecules in the air stream after treatment in the oxidizer 12.

The oxidizer 12 and the molecular sieve 16 are series connected by lines 20 and 21. A line 24 conveys the fully treated zero air to the analyzer system. A line 26 connects the system 10 with a source of air from a standard shop compressor or similar source of normally contaminated air and a forward pressure regulator 40 and a needle valve flow regulator 42 are provided in the line 26. Output from the molecular sieve 16 can be led directly to the analytical instruments and the output is controlled by a capillary and check valve assembly 28. Pressure within the system 10 is regulated by a back pressure regulator 30.

In operation contaminated air, such as air obtained from a conventional shop compressor, is led into the system 10 through the line 26 to the oxidizer 12. As mentioned the inlet pressure to the system 10 should be at least 60 psig and the flow rate on the order of 5 L/min or greater. In the oxidizer 12 hydrocarbon contaminants are oxidized to CO, $CO_2$ and $H_2O$ nitrogen oxides are oxidized to $NO_2$. The treated air is led by the line 20 to the molecular sieve 16 for filtration to remove $NO_2$, CO, $CO_2$, and $H_2O$ that is formed by the system treatment contaminants initially present in the untreated air.

The molecular sieve 16 also filters any unreacted hydrocarbon that is not oxidized or which enters the system downstream of the oxidizer 12. It is preferred to incorporate a conventional dryer 14 in the line 20 to remove moisture from the treated air prior to entering the molecular sieve 16.

The molecular sieve 16 is regenerated from time to time as the adsorptive surfaces of the alumina silicate pellets become coated with absorbed molecules. Regeneration is carried out by reverse flushing the pellets with dry air. For this purpose a line 32 is connected to a source of dry air 34 and a solenoid switching valve 36 in the line 20 is activated, to divert the flushing air from the molecular sieve 16 to a vent line 38. To decrease the frequency of regeneration of the molecular sieve, it is preferred that the air entering the system 10 be as dry as possible since excess moisture will exhaust the adsorbent capacity of the alumina silicate pellets more quickly. Accordingly, it is preferred to incorporate a dryer (not shown) in the line 20 to remove moisture from the air prior to its entering the system 10.

Figure 2:
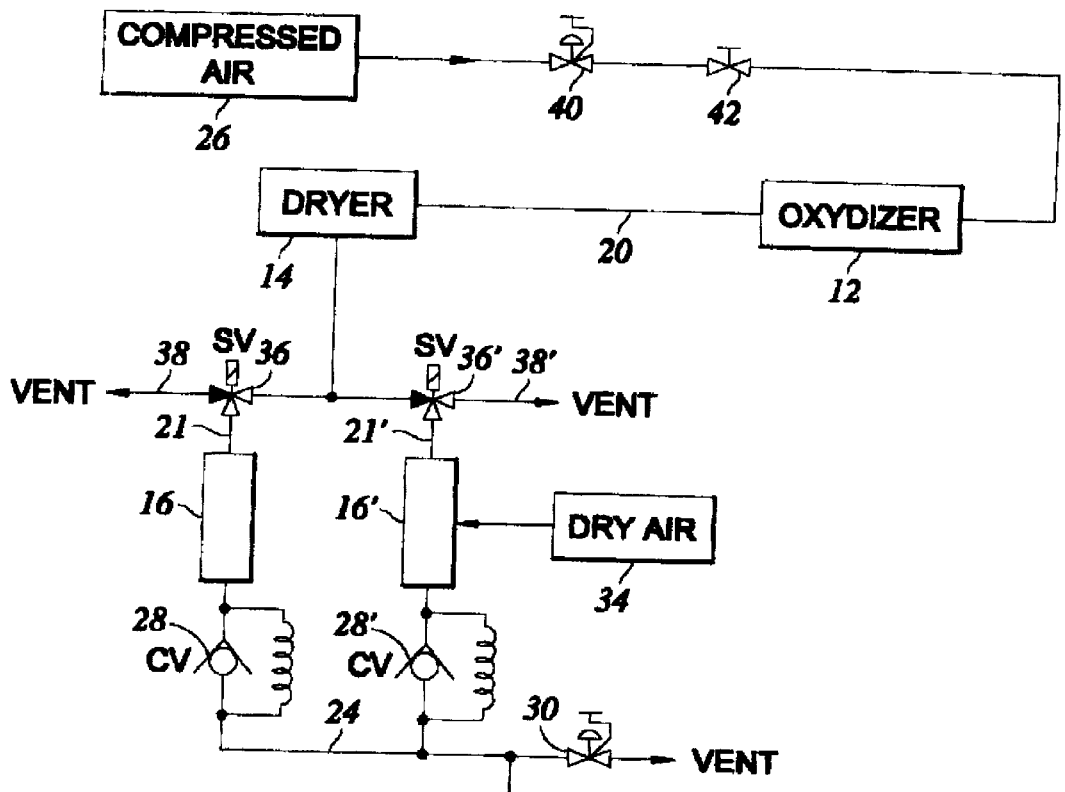
FIG. 2 is a flow diagram of another embodiment of the present invention.

It will be clear that during regeneration of the molecular sieve 16, the system 10 must be shut down. To avoid the necessity of terminating operation of the system 10 to allow for regeneration of the molecular sieve 16, another embodiment of the invention employs multiple molecular sieves 16 and 16' which are sequentially active in the system 10 so that as one sieve is being regenerated the other is active in the system. Referring to FIG. 2 where like reference numbers designate parts already described above, the system 10 comprises the oxidizer 12 and a pair of molecular sieves 16 and 16'. The molecular sieves 16 and 16' are connected in parallel to the line 20 from the oxidizer 12 by lines 21 and 21', solenoid valves 36 and 36', and lines 44 and 46. Lines 32 and 32' communicate with sources of dry 34 and 34' respectively for flushing the molecular sieves 16 and 16' and vent lines 38 and 38' are connected to the solenoid valves 36 and 36' for venting the flushing air from the molecular sieves 16 and 16' respectively.

The system 10 shown in FIG. 2 operates in the same manner as already described in connection with the system as illustrated in FIG. 1 except that the solenoid valves 36 and 36' are operated to close down their respective molecular sieve 16 and 16' for flushing while the other is operative in the system. For example, when the solenoid valve 36' is operated for flushing the molecular sieve 16', the line 46 is closed to the sieve and the vent line 38' is opened so that the molecular sieve 16' can be reversed flushed with the dry air. At the same time the solenoid valve 36 is positioned to open the line 21 and to close the vent line 38 to permit the flow of air from the oxidizer 12 to the molecular sieve 16. When the molecular sieve 16 requires regeneration the positions of the solenoid valves 36 and 36' are reversed so that the line 21 is closed and the vent line 38 is opened while the line 21' to molecular sieve 16' is opened and the vent line 38' is closed.

It has been noted that a freshly regenerated molecular sieve utilizing aluminosilcate materials produces an oxygen spike when it is first put on line after regeneration. The first portion of air from the molecular sieve contains a higher than normal oxygen concentration which adversely affects certain analyzers such as a flame ionization detector (FID) or chemiluminescence detector (CLD). Oxygen spiking results from a large concentration of oxygen released when the sieve is placed back in service after regeneration. Although not fully understood, it is believed that the increased concentration of oxygen is due to oxygen of the dry flushing air being trapped by the molecular sieve adsorbent material.

When placed back in service, the air being treated contains sufficient moisture which is preferentially exchanged with the oxygen on the absorbent material causing a rapid oxygen release in the purified air. This is normally not a problem with the larger zero air generating systems because such systems utilize air reservoirs which permit the oxygen concentration to equilibrate before the air is used. However, the present system is designed to operate at a relatively low flow rate and under normal circumstances, the zero grade air is used as it is produced. Accordingly it is highly preferred to use the aluminosilicate material containing alkali metal or alkali earth metal oxides with $H^+$ cation since the cations of such molecular sieve adsorbent material have a greater affinity for oxygen and can retain and slowly release the oxygen even in the presence of the moisture in the air being treated.

It has also been found that treating a sieve material such as Union Carbide Type 4A with ammonium hydroxide and combining the treated sieve material with a sieve material such Union Carbide 13 X in a ratio of one part of sieve material type 4A to nine parts of 13 X will also avoid the oxygen spiking problem.

The following examples illustrate the operation of the system 10 of the invention and are for illustrative purposes only. The invention is not to be considered as being limited to the precise examples given.

EXAMPLE 1

The system 10 for generating zero air illustrated in FIG. 2 and described above was connected to the sample input of a Model 240 FID Analyzer manufactured by California Analytical Instruments of Orange, Calif. The oxidizer catalyst was maintained at about 500° C. The FID Analyzer was specially modified to read 50 ppm $CH_4$ full scale. The zeolite material used in the molecular sieve was Zero Air $CO_2$ Adsorbent, Type X. Using a sample containing 49.9 ppm $CH_4$, the FID span was set to read 49.9. Then the same test sample was routed to the hydrocarbon FID analyzer after passing through the zero air system 10 at a flow rate of about 10.5 L/Min. The FID Analyzer read the CH4 content as less than 0.1 ppm.

EXAMPLE 2

A sample of air containing 40 ppm of CO was first measured on a Model 200 infrared CO Analyzer manufactured by California Analytical Instruments of Orange, California. An output reading of 20 was obtained from the instrument meter. The 43 ppm CO containing air was then passed through the zero air system 10 used in Example 1 and then through to the CO Analyzer. The reading was close to zero showing good efficiency in removal of CO by the zero air system.

EXAMPLE 3

Following the procedure set out in Example 2, a blend consisting of 40 PPM $CO_2$ and air was first measured by a CAI Model 200 $CO_2$ infrared analyzer manufactured by California Analytical Instruments of Orange, Calif. The $CO_2$/air sample was then passed through the zero air system. The treated sample was measured on the infrared analyzer. The meter display of the analyzer indicated complete removal of $CO_2$ from the air after treatment by the zero air system.

EXAMPLE 4

Following the procedure of Example 3, the $CO_2$ content of the sample air was increased to 980 ppm. The oxygen content of the sample was 19.8% and the balance was nitrogen. The untreated sample air was measured by the Model 200 $CO_2$ infrared analyzer and the meter display indicated saturation. The air was then passed through the zero air system 10 and then to the infrared analyzer. The meter output reading from the analyzer was nearly zero indicating that essentially all of the $CO_2$ had been removed by the zero air system.

EXAMPLE 5

A model 240 chemiluminescent detector (CLD) analyzer manufactured by California Analytical Instruments of Orange, Calif. was spanned with a 39 ppm NO/N sample in the NOX mode. The sample was dynamically blended with air to have a 1:1 mixture of air to sample ratio. The reading for the air/sample blend decreased to 19 ppm of NOx when analyzed in the Model 240 analyzer. The reading was zero when a sample of NOx free air was analyzed. The air/sample blend containing 19 ppm NOx was then passed through the zero air system 10 used in Example 1 and after treatment the output of the system 10 was analyzed by the CLD analyzer for NOx content. The detector reading was zero and unchanged from the reading obtained with the NOx free air.

From the foregoing it can be seen that the method and system of the present invention is capable of producing clean instrument air from highly contaminated air sources such as would be the case in most shops and garages. The quality of air thus produced conforms to EPA specifications IM-240 for emissions testing and is suitable for use with research laboratory apparatus. The present invention eliminates the need to purchase and store clean air or obtain expensive, high output systems for producing clean air for use in situations requiring a lower quantity of clean air which can meet very stringent requirements.

As will be understood by those skilled in the art, various arrangements which lie within the spirit and scope of the invention other than those described in detail in the specification will occur to those persons skilled in the art. It is therefore to be understood that the invention is to be limited only by the claims appended hereto.

Having described our invention, we claim:

1. An analytical instrument zero air generator for the production of purified air for direct use by analytical instruments, said purified air containing less than 1 ppm of oxides of nitrogen, less than 1 ppm of total hydrocarbons, less than 1 ppm of CO and less than 1 ppm $CO_2$, consisting of the combination of:

a catalytic oxidizer unit for oxidizing hydrocarbons and the oxides of nitrogen, at least one molecular sieve unit containing an absorbant filtering material, said units being interconnected in series for the continuous processing of a stream of air from a source of unpurified air, said molecular sieve being the final unit in said series.

2. The zero air generating system of claim 1 wherein said adsorbent filtering material in said molecular sieve comprises an aluminosilicate containing one or more oxides selected from the group consisting of the alkali metals, the alkali earth metal and combinations thereof.

3. The zero air generating system of claim 1 further including at least a second molecular sieve unit connected in parallel with said first molecular sieve unit whereby one of said molecular sieve units is interconnected in said system and said other molecular sieve unit is disconnected from said system.

4. The zero air generating system of claim 1 wherein said catalytic hydrocarbon oxidizer unit temperature is maintained at between about 200° C. and about 500° C.

* * * * *